J. G. KJELLGREN.
RAIL BOND.
APPLICATION FILED NOV. 22, 1916.

Inventor:
John G. Kjellgren, by

Attorneys.

Patented Oct. 31, 1922.

1,434,214

UNITED STATES PATENT OFFICE.

JOHN G. KJELLGREN, OF CLEVELAND, OHIO, ASSIGNOR TO THE ELECTRIC RAILWAY IMPROVEMENT COMPANY, OF CLEVELAND, OHIO, A CORPORATION OF OHIO.

RAIL BOND.

Application filed November 22, 1916. Serial No. 132,844.

*To all whom it may concern:*

Be it known that I, JOHN G. KJELLGREN, a subject of the King of Sweden, and residing at Cleveland, in the county of Cuyahoga and State of Ohio, have invented a certain new and Improved Rail Bond, of which the following is a specification.

My invention relates to rail bonds and particularly to an improved construction of the bond terminals to facilitate their attachment to the rail heads. The invention is particularly applicable to bonds of heavy capacity such as are commonly utilized for uniting adjacent rails of electric railways in which a heavy current is carried.

Referring to the accompanying drawings.

Figure 1:
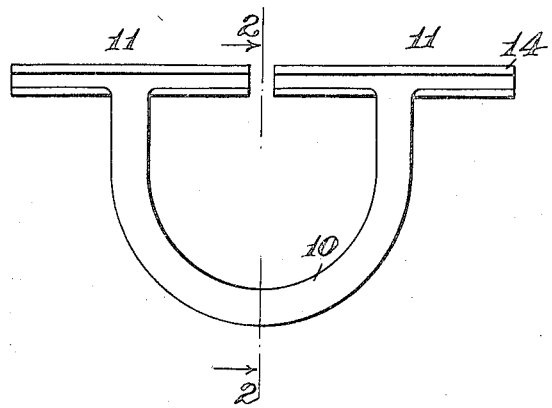
Fig. 1 is a side elevation of a bond in which my invention is embodied in one form.
Figure 2:
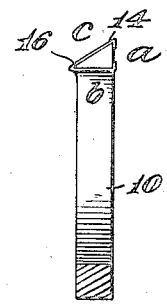
Fig. 2 is a section on the line 2—2, Fig. 1.
Figure 3:
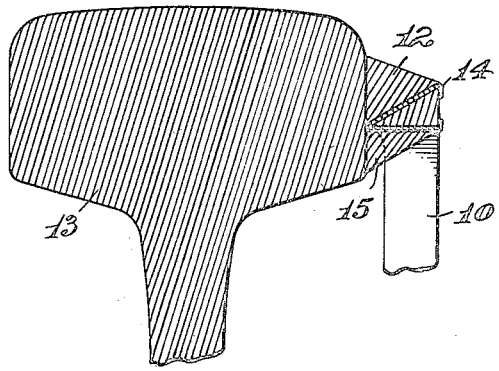
Fig. 3 is an end elevation showing the bond applied to a rail head.
Figure 4:
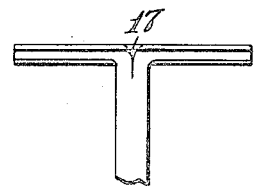
Fig. 4 is a side elevation of a modified construction of one of the terminals of the bond.
Figure 5:
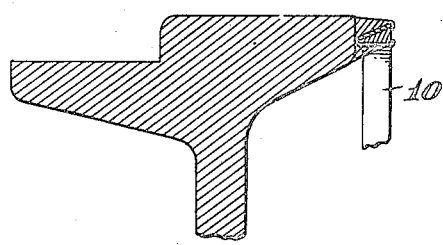
Fig. 5 is an end elevation of the bond applied to a rail head of different type.
Figure 6:
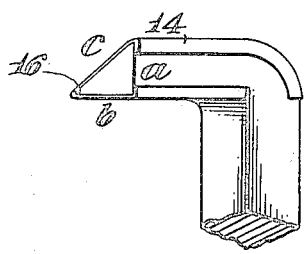
Fig. 6 is a perspective of another form of construction.

Rail bonding is of two general types, viz., that effected by a conductor mechanically jointed to the adjacent rail ends and secondly, that effected by a conductor electrically welded to the adjacent rail ends. The present invention relates to bonding of the second type, which is generally acknowledged to be the more efficacious, since it has been found impossible to secure a mechanical union sufficiently perfect to exclude moisture and prevent deterioration of the joint through oxidation of the metal at this point.

Welded bonds have been made heretofore generally by the Thomson method of resistance welding and have been characterized by the welding of a copper conductor either directly or through a brass terminal jacket, to the rail by a current sufficiently heavy and under conditions such that a resistance heat is generated which is sufficient to fuse the metals together. Bonding in this manner requires heavy apparatus, consumes considerable time, may not be interrupted during the operation, and necessitates expert attention and the exercise of great care to secure a serviceable joint, particularly in view of the fact that the joint is made between copper or brass and steel.

It has also been proposed to unite the bond to the rail by pencil-welding (Silliman 1,168,753), an operation which is readily accomplished with relatively light, portable apparatus needing neither the skill nor the care requisite to the Thomson method, particularly if the bond is first provided with an iron terminal between which and the rail the welded joint is made. In spite of the advantages of this method, it has not gone into practical use by reason of the fact that the bond terminals have not been formed in advantageous manner, and defective joints have resulted. Thus while Silliman proposes to face the side of his bond at its terminal end with a wedge shaped piece of iron at the time of its manufacture, and make the welded joint to the rail between this iron plate and the rail head, the shape of his terminal plate is such that an efficient workmanlike joint cannot be made. Briefly, the trough between his wedge shaped plate and the rail head is too narrow to permit the end of his electrode pencil to enter the bottom of the trough and fusion is confined to the upper portion of the plate and the opposed portion of the rail, with the result that the joint is not only mechanically weak but also introduces an area of high resistance between the bond and the rail head through the relatively narrow bridge weld at the top of the trough. It is also impossible from a practical standpoint to thicken the plate and alter the angle of its welding face so as to afford a sufficiently open trough since this would not only space the bond proper objectionably far from the rail, but also mechanically weaken its position with relation to the rail and at the same time interpose a still greater quantity of relatively high resistance material between the bond and the rail head.

To overcome these defects while at the same time retaining the advantages of the pencil weld method, I have devised an improved terminal head which is exemplified in the accompanying drawings. As here shown the body of the bond 10 is of U-shape, with my improved terminal 11 at each end of the bond.

Irrespective of the cross sectional shape of the body of the bond, the terminal head thereof is of approximately triangular cross section, preferably with an outer vertical face $a$, horizontal bottom face $b$ and inclined upper face $c$ so that upon the application of the bond to the rail a wide open trough 12 is afforded between the upper face $c$ of the terminal head and the approximately vertical face of the rail head 13. Since it is difficult to weld copper and steel together, I preferably cover the welding face or faces of the bond with a relatively light sheet 14 of sheet iron, which may be bent around the bond end and welded to the latter in the shop where conveniences for this operation are available and a good electrical connection between the bond and its iron sheath may be assured. In the present case I have shown both the upper and lower faces $b$ and $c$ of the terminal so sheathed, since I prefer not only to fill the trough 12 with the fused metal of the weld, but also to support the bond from beneath by additional metal 15, an operation which is readily accomplished in pencil welding, as is well understood. This metal 15 not only affords an additional conductor area through the relatively high resistance iron, but also serves to mechanically support the bond against the blows to which it is commonly subjected by wagon wheels, etc.

It will be noted that owing to the improved configuration of the bond terminals the copper of the latter is spaced from the rail head by only the slight thickness of the metal sheath at the point at which the corner 16 of the bond approaches the rail head, thus reducing to a minimum the resistance between the bond and the rail at this point. At the same time, the increased area of bonding metal affords a good electrical connection.

A further feature of improvement has also been introduced in my terminal to obviate the internal strains at the joint incident to the different coefficients of expansion of copper or brass and iron. When the terminal is of considerable length—say three inches—the internal strains at the joint owing to the difference in the coefficients of expansion are apt to produce ruptures between the bond and the rail, with consequent lessening of the intimate contact area and accompanying introduction of increased resistance by reason of the greater current passing through the still united portions of the joint. To eliminate this defect, I divide the copper portion of the terminal into a plurality of parts spaced by a vertical rift, so that the internal strains incident to varying temperature conditions are localized and not cumulative as they are when the copper terminal is continuous throughout. The divisions of the terminal may be confined to the copper end of the bond, while the iron sheath may be and preferably is maintained continuous. I have indicated this construction in the drawings, in which but a single rift 17 is shown midway between the ends of the terminal. This feature enables me to provide a bond terminal of great length and slight vertical height,—a construction of great value where the bond is to be used with rails having narrow heads to which the bonds are attached. This type of rail is commonly employed in urban railways. Moreover, in any event it has the effect of lessening the depth of the welding trough and increasing the area of the copper terminal head which is in close proximity to the rail, thus facilitating the making of a perfect joint and lessening the resistance material between the bond and the rail. Obviously, since each arm of the terminal head forms a continuation of but a portion of the body of the bond, each arm has a less current-carrying capacity than the body of the bond, although the sum of the capacities of the arms of the terminal equals that of the bond body.

Various modifications and variations will readily occur to those skilled in the art which do not depart from what I claim as my invention, and I do not limit my invention to the particular structures shown.

I claim as my invention:—

1. A rail bond having a copper body and terminal, said terminal having a generally triangular cross section adapted on juxtaposition to the rail to form an open welding trough therebetween, said terminal having a substantially horizontal lower face, a substantially vertical outer face and an inclined upper face forming one side of said trough, together with an iron sheathing on the horizontal and inclined faces of said terminal.

2. A completed rail bond comprising a bond body having at its end an integral terminal portion generally triangular in cross section with a substantially horizontal lower and inclined upper face in assembled position with relation to a rail, iron sheathing welded to the upper and lower faces of said terminal portion, and welding material extending between the rail and terminal and uniting both upper and lower faces of the latter to the rail to afford an extended electrical connection and support for the bond, substantially as described.

3. A rail bond having a copper body and terminal, said terminal being of angular cross section and shaped to present, in welding position, an edge to the rail, with an upwardly inclined side forming, with the rail, an open trough to receive welding material, and an outwardly extending side below said edge, both said upwardly and outwardly extending sides being faced with an iron sheath welded thereto to facilitate the welding of the head to the rail.

4. A rail bond having a terminal of angular cross section and having in welding position two faces, each approaching the rail at an angle of at least 60 degrees therefrom, and adapted to receive welding material by which said terminal is mechanically and electrically connected to the rail, together with a metallic sheathing for each of said faces adapted to facilitate the welding union between the terminal and the rail.

5. A rail bond having a body portion of any suitable cross section, a terminal portion deformed in cross section to afford, in welding position against the rail, a face inclined at least 60 degrees from the cooperating rail face, and a ferrous sheath for said terminal to facilitate a welded union between the latter and the rail.

6. A rail bond having a flexible body member and a ferrous terminal jacket open on one side, the sides of said jacket being inclined with relation to each other and engaging the bond therebetween.

7. A rail bond having a body member of any suitable cross section, a terminal portion of angular section and a ferrous sheet metal jacket welded to said terminal portion and affording a welding face adapted to be positioned at an angle of at least 60° to the rail in bonding position.

8. A rail bond having a body member of any suitable cross section, a terminal portion of angular section and a ferrous sheet metal jacket welded to said terminal portion and affording a pair of welding faces, each adapted to be positioned at an angle of at least 60° to the rail in bonding position.

In testimony whereof I have signed my name to this specification, in the presence of two subscribing witnesses.

JOHN G. KJELLGREN.

Witnesses:
W. Van Nostran,
D. S. Arnold.